(12) United States Patent
Christiansen

(10) Patent No.: US 7,360,334 B2
(45) Date of Patent: Apr. 22, 2008

(54) FISHING GARMENT SYSTEM

(76) Inventor: Bart G. Christiansen, 38666 County Road 21, Elizabeth, CO (US) 80107

(*) Notice: Subject to any disclaimer, the term of this patent is extended or adjusted under 35 U.S.C. 154(b) by 0 days.

(21) Appl. No.: 11/470,495

(22) Filed: Sep. 6, 2006

(65) Prior Publication Data

US 2007/0214702 A1    Sep. 20, 2007

Related U.S. Application Data

(60) Provisional application No. 60/783,687, filed on Mar. 17, 2006.

(51) Int. Cl.
    *A01K 77/00* (2006.01)
(52) U.S. Cl. .............. 43/11; 2/94; 24/16 PB; 24/303; 24/343; 224/183; 248/683
(58) Field of Classification Search ............ 43/7, 43/8, 11, 12; 2/94; 224/183; 24/16 PB, 24/303, 343–345; 248/74.2, 74.3, 230.8, 248/206.5, 467, 683
    See application file for complete search history.

(56) References Cited

U.S. PATENT DOCUMENTS

| | | | | |
|---|---|---|---|---|
| 440,568 | A * | 11/1890 | Hebard | 43/12 |
| 525,619 | A * | 9/1894 | Pearsons | 43/12 |
| 546,023 | A * | 9/1895 | Meisselbach | 43/12 |
| 941,961 | A * | 11/1909 | Spiegle | 43/12 |
| 1,024,653 | A * | 4/1912 | Sargent | 43/11 |
| 1,426,024 | A * | 8/1922 | Thureson | 2/94 |
| 1,736,624 | A * | 11/1929 | Richardson | 43/11 |
| 1,894,192 | A * | 1/1933 | Olson | 43/12 |
| 2,172,175 | A * | 9/1939 | Probst | 43/11 |
| 2,212,756 | A * | 8/1940 | Stewart | 43/11 |
| 2,372,685 | A * | 4/1945 | Schaich | 89/35.01 |
| 2,455,765 | A * | 12/1948 | Harvey | 43/11 |
| 2,469,978 | A * | 5/1949 | Mrozinski | 43/11 |
| 2,475,914 | A * | 7/1949 | Peterson | 224/920 |
| 2,491,703 | A * | 12/1949 | Bell | 43/12 |
| 2,504,356 | A * | 4/1950 | Stalker | 43/11 |
| 2,578,237 | A * | 12/1951 | Geistweit | 43/11 |
| 2,597,601 | A * | 5/1952 | Sherman | 43/57.1 |
| 2,630,646 | A * | 3/1953 | Jensen et al. | 43/12 |
| 2,637,133 | A * | 5/1953 | Ross | 43/12 |
| 2,688,815 | A * | 9/1954 | Phillips | 43/12 |

(Continued)

FOREIGN PATENT DOCUMENTS

CA    2224637 A1 *    9/1999

(Continued)

*Primary Examiner*—Darren W. Ark
(74) *Attorney, Agent, or Firm*—Townsend and Townsend and Crew LLP

(57) ABSTRACT

A fishing net system comprises a handle having a top and a bottom. A loop extends from the bottom of the handle, and a mesh is attached to the loop. A connector system is operably coupled to the fishing net at a location spaced apart from the top of the handle. The connector system is configured to removably couple the fishing net to a user's back. A method is also provided for attaching a landing net to the back panel of a fishing garment, which includes the steps of removably coupling the handle of the landing net to the top section of the garment; and removably coupling the landing net to the middle section of the garment.

9 Claims, 4 Drawing Sheets

U.S. PATENT DOCUMENTS

| | | | | |
|---|---|---|---|---|
| 2,693,654 A * | 11/1954 | Clark | | 224/183 |
| 2,717,391 A * | 9/1955 | Bracken | | 2/94 |
| 2,724,920 A * | 11/1955 | Boehm | | 43/12 |
| 2,841,847 A * | 7/1958 | Wallace | | 43/11 |
| 2,853,709 A * | 9/1958 | Peterson et al. | | 43/54.1 |
| 2,907,085 A * | 10/1959 | Bosland | | 24/303 |
| 2,959,832 A * | 11/1960 | Baermann | | 24/303 |
| 2,975,497 A * | 3/1961 | Budreck | | 24/303 |
| 3,000,384 A * | 9/1961 | Piers, Jr. | | 24/16 PB |
| 3,023,530 A * | 3/1962 | Jacob | | 43/12 |
| 3,111,736 A * | 11/1963 | Budreck | | 24/303 |
| 3,289,990 A * | 12/1966 | Grantham | | 248/683 |
| 3,298,579 A * | 1/1967 | Smith | | 224/183 |
| 3,321,119 A * | 5/1967 | D Andrea | | 224/183 |
| 3,472,391 A * | 10/1969 | Bolognesi | | 248/683 |
| 3,827,019 A * | 7/1974 | Serbu | | 335/285 |
| 3,886,508 A * | 5/1975 | Lavrard | | 2/94 |
| 3,952,930 A * | 4/1976 | Baldocchi | | 224/193 |
| 4,151,938 A * | 5/1979 | Barker et al. | | 224/183 |
| 4,182,470 A * | 1/1980 | Atkinson | | 224/183 |
| 4,324,061 A * | 4/1982 | Stepp | | 43/8 |
| 4,325,504 A * | 4/1982 | Amani | | 224/183 |
| 4,477,993 A * | 10/1984 | Woermbke | | 43/11 |
| 4,516,347 A * | 5/1985 | Dickie | | 43/11 |
| 4,571,875 A * | 2/1986 | Ballas | | 43/11 |
| 4,723,695 A * | 2/1988 | Farber | | 2/94 |
| 4,774,783 A * | 10/1988 | Willard | | 43/12 |
| 4,980,988 A * | 1/1991 | Whitman | | 43/11 |
| 5,025,843 A * | 6/1991 | Caufield | | 150/160 |
| 5,050,276 A * | 9/1991 | Pemberton | | 24/303 |
| 5,099,659 A * | 3/1992 | Carranza et al. | | 24/303 |
| 5,107,545 A * | 4/1992 | Potter | | 2/46 |
| 5,167,355 A * | 12/1992 | Hill | | 224/193 |
| 5,197,168 A * | 3/1993 | Levy | | 24/303 |
| 5,276,989 A * | 1/1994 | Lumb et al. | | 43/11 |
| 5,419,473 A * | 5/1995 | Lamar | | 224/632 |
| 5,456,037 A * | 10/1995 | Dorval | | 43/11 |
| 5,465,425 A * | 11/1995 | Crispin | | 2/94 |
| 5,568,697 A * | 10/1996 | Schwartz | | 43/12 |
| 5,651,141 A * | 7/1997 | Schneider | | 43/11 |
| 5,657,917 A * | 8/1997 | Johnson et al. | | 224/582 |
| 5,682,653 A * | 11/1997 | Berglof et al. | | 224/183 |
| 5,715,539 A * | 2/1998 | Benecki et al. | | 2/160 |
| 5,845,373 A * | 12/1998 | Langer | | 24/303 |
| 5,852,828 A * | 12/1998 | Foster | | 2/94 |
| 5,857,651 A * | 1/1999 | Kunevicius | | 248/230.8 |
| 5,996,267 A * | 12/1999 | Breckenridge | | 43/12 |
| 6,032,399 A * | 3/2000 | DePoe | | 43/12 |
| 6,036,067 A * | 3/2000 | Alcorn | | 43/54.1 |
| 6,163,889 A * | 12/2000 | Tate | | 2/209.13 |
| 6,178,684 B1 * | 1/2001 | Nyakas et al. | | 43/12 |
| 6,193,202 B1 * | 2/2001 | Rogers | | 248/683 |
| 6,381,890 B1 * | 5/2002 | Sjostedt | | 248/206.5 |
| 6,561,206 B1 * | 5/2003 | Wilkinson | | 248/206.5 |
| 6,584,724 B1 * | 7/2003 | Le Blanc | | 43/11 |
| 6,651,945 B2 * | 11/2003 | Rivellino et al. | | 248/206.5 |
| 6,672,551 B2 * | 1/2004 | Rivellino et al. | | 248/206.5 |
| 6,681,515 B2 * | 1/2004 | Grill | | 43/12 |
| 7,066,361 B1 * | 6/2006 | Williams | | 224/194 |
| 7,104,003 B2 * | 9/2006 | Wilson | | 43/11 |
| 7,124,921 B1 * | 10/2006 | Hubbell | | 224/148.2 |
| 7,131,616 B2 * | 11/2006 | Livingstone | | 248/206.5 |
| 7,181,939 B2 * | 2/2007 | Andersen | | 70/395 |
| 7,243,377 B2 * | 7/2007 | Ashy | | 2/209.13 |
| 2004/0040196 A1 * | 3/2004 | Schwartz | | 43/11 |
| 2004/0064996 A1 * | 4/2004 | Armenti | | 43/7 |
| 2006/0174395 A1 * | 8/2006 | Mayo | | 2/160 |
| 2006/0225336 A1 * | 10/2006 | Redfearn | | 43/9.2 |
| 2006/0260182 A1 * | 11/2006 | Bennis | | 43/44.9 |
| 2007/0017942 A1 * | 1/2007 | Hubbell | | 224/148.2 |
| 2007/0119891 A1 * | 5/2007 | Lawrence | | 224/669 |

FOREIGN PATENT DOCUMENTS

| | | | |
|---|---|---|---|
| FR | 2658699 A1 * | 8/1991 | |
| GB | 2322279 A * | 8/1998 | |
| GB | 2343097 A * | 5/2000 | |
| JP | 2003-235403 A * | 8/2003 | |
| JP | 2004-57034 A * | 2/2004 | |

* cited by examiner

FISHING GARMENT SYSTEM

CROSS REFERENCES TO RELATED APPLICATIONS

This application is a continuation in part and claims the benefit of now abandoned U.S. Provisional Application No. 60/783,687, filed Mar. 17, 2006, the complete disclosure of which is herein incorporated by reference.

BACKGROUND OF THE INVENTION

In the sport of fly fishing, it is common for the fisherman to use a landing net to facilitate the removal of the caught fish from the water. Nonetheless, the landing net is only used occasionally. It is therefore desirable for the landing net to be readily accessible when needed, but to be stored in a location that does not interfere with routine fishing operations such as moving through brush or other obstacles to the fishing site, casting a fly, or operating a rod and reel. The prior art contains several systems for attaching a landing net to a garment worn by the fisherman. For example, Sargent U.S. Pat. No. 1,024,653 describes a device which comprises a clip adapted to removably hold the round handle of a landing net in a vertical position on the back of a fisherman's garment. Braken U.S. Pat. No. 2,717,391 discloses a fishing garment having a loop that extends down from the neck along the back panel of the garment and carries a ring to which a landing net may be attached. Farber U.S. Pat. No. 4,723,695 describes a pouch-like support adapted for attachment to the back of a fisherman's garment for removably accommodating a landing net. The complete disclosures of all these references are herein incorporated by reference.

Many currently commercially available fishing vests have a single ring sewn near the top of the vest to allow a landing net to be clipped onto the vest using a detachable clip or magnet attached to the net handle. This arrangement works well while the fisherman is standing vertically, but whenever the fisherman bends over, e.g. to grab something, to duck under an obstruction, to work on something, etc., the net may slip off the fisherman's back, swing to the side, and fall into the fisherman's face or otherwise interfere with the fisherman's activities. This may happen many times during the day and can be annoying.

SUMMARY OF THE INVENTION

The present invention relates to a fishing garment system and method wherein a landing net may be removably secured to the back of a garment, waders, other clothing, fishing vest or the like, and yet stay in place when the fisherman bends over, leans to the side or otherwise moves. In one embodiment, a fishing net system comprises a handle having a top and a bottom. A loop extends from the bottom of the handle, and a mesh is attached to the loop. A connector system is operably coupled to the fishing net at a location spaced apart from the top of the handle. The connector system is configured to removably couple the fishing net to a user's back. In this way, the connector system may be used to hold the net in place on the user's back when not in use.

A variety of connector systems may be used to couple the fishing net to the user's back, and may be integrally formed with the net, removably attached or may be provided as a retrofit item. One example of a connector system comprises at least one magnet that is coupled to the handle near where the handle reaches the loop. Another example is a first pair of magnets positioned on opposite sides of the mesh, and a second pair of magnets configured to be placed on opposite sides of a user's garment.

In some cases, the fishing net will also have a coupling system that is coupled to the top end of the handle. With this configuration, the coupling system and the connection system secure the landing net in a vertical position on a back a user's garment when not in use.

In a further embodiment, the invention provides a kit for removably coupling a landing net to a user's garment. The kit comprises a connection system that is configured to secure the landing net in a vertical position on the back panel of the fishing garment when not in use, and the connection system comprises a net portion and a garment portion. The kit further includes instructions for using the connection system. The instructions may include steps for removably coupling the net portion to the landing net and the garment portion to the garment, and for removably coupling the landing net to the garment using the net portion and the garment portion.

In yet another embodiment, a fishing garment system of the invention comprises a fishing garment, e.g. a vest, having a back panel with a top section and a middle section, and a landing net having a handle and a loop with attached mesh. A first connection system is provided that removably couples the end of the landing net handle to the top section of the garment back panel and a second connection system is provided that removably couples the intersection of the handle and loop of the landing net to the middle section of the garment back panel.

In preferred embodiments, the first and second connection systems each comprise a pair of complementary connectors that removably couple with each other. In one embodiment, the first connection system may comprise a ring attached to the garment back panel and a clip attached to the landing net handle. In other embodiments, the first connection system may comprise a first and a second magnet, one magnet and a metal plate to which the magnet is attracted, or a first and a second hook and loop fastener (e.g. Velcro® tape), one of which is attached to the back panel of the garment and the other of which is attached to the landing net handle.

In one embodiment, the second connection system may comprise a first magnet and second magnet, one magnet and one metal plate attractive to the magnet, or a first and a second hook and loop fastener. One of these connectors may be attached to the middle section of the back panel of the fishing garment, and the other connector may be attached to the intersection of the handle and the loop on the landing net. In one embodiment, one of these connectors may be disposed on the surface of a support that is clipped onto, or sewn into, the fabric in the middle section of the back panel, and one of the connectors may be disposed on a connecting adaptor comprising a circumferential strap adapted to wrap around the landing net handle and a middle strap adapted to engage the circumferential strap at each end thereof and wrap around the landing net loop at the intersection of the handle and the loop.

A method is also provided for attaching a landing net to the back panel of a fishing garment, which comprises the steps of removably coupling the handle of the landing net to the top section of the back panel; and removably coupling the intersection of the handle and loop of the landing net to the middle section of the back panel.

DETAILED DESCRIPTION OF THE INVENTION

The invention will be further described with reference to the drawings. The same number is used in different drawings to refer to the same elements.

The invention provides a variety of techniques for securing a fishing net to a garment or other article. For example, the techniques of the invention may be used to removably couple a fishing net to a fishing vest, chest waders, shirts, jackets or other types of apparel and garments. To removably couple the fishing net to such articles, a variety of techniques may be used. Typically, such nets will be configured to clip to a garment, such as at the end of the handle. Some aspects of the invention provide an additional removable coupling arrangement somewhere on the article being worn by the fisherman to prevent the net from swinging side to side or even over the top of the fisherman. Such a removable coupling arrangement can be integrally formed with the net or may be a removable coupling arrangement. In this way, the coupling arrangement may be sold as an integral part of the net or may be retrofit. Similarly, the connection system may be an integral part of the clothing or garment, or may be attached after purchasing the garment. Further, the coupling arrangement may be provided anywhere along the net or on the garment, but will typically be located somewhere along the handle and the back of the user.

Some of the embodiment may use magnets to removably couple the net to the garment, although other connectors may be used, such as a hook and loop fastener material. When magnets are used, they may be provided in pairs so that they may be easily be coupled to the net or clothing with essentially no alterations. For example, one pair of magnets may be placed on opposite sides of the net's mesh and the other pair may be placed on opposite sides of the garment. The first pair of magnets may then be coupled to the second pair to secure the net to the garment.

Figure 1:
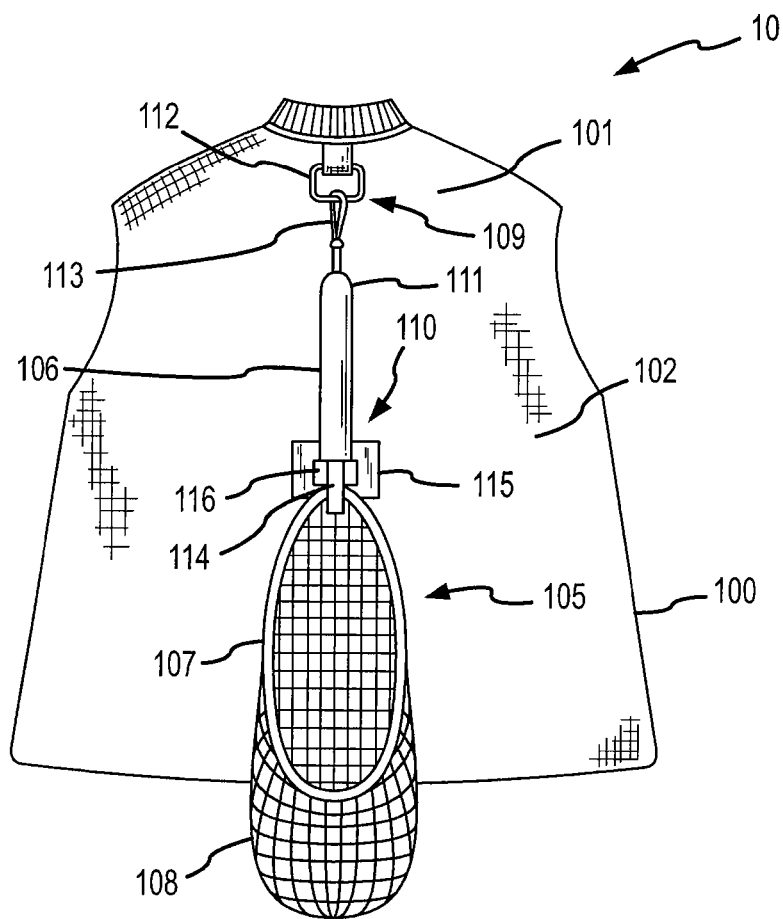
FIG. 1 illustrates a rear perspective view of a fishing garment system according to one embodiment of the present invention.

FIG. 1 illustrates one embodiment of a fishing garment system 10 according to the invention. Fishing garment 10 comprises a fishing vest 100 having a back panel with a top section 101 and a middle section 102. Landing net 105 comprises handle 106 and loop 107 to which mesh 108 is attached. In accordance with the present invention, a first connection system 109 removably couples handle 106 of landing net 105 to vest 100, and a second connection system 110 removably couples intersection 114 of landing net 105 (where handle 106 joins loop 107) to vest 100. However, it will be appreciated that the second connection system 110 could be located anywhere along handle 106, on loop 107, or at multiple locations on the net 105.

Figure 2:
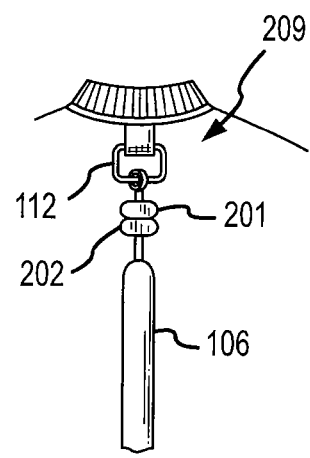
FIG. 2 illustrates a perspective view of one embodiment of an alternative connection system according to the invention.

As illustrated in FIG. 1, first connection system 109 comprises ring 112 secured to top section 101 of vest 100 and clip 113, which is attached to end 111 of handle 106. Clip 113 is adapted to engage ring 112 when landing net 105 is not in use, and is adapted to disengage ring 112 when landing net 105 is needed. FIG. 2 illustrates an alternative first connection system 209 that removably couples ring 112 of vest 100 to handle 106 of landing net 105. Connection system 209 comprises a first magnet 201 secured to ring 112 and a second magnet 202 secured to handle 106. When landing net 105 is not in use, first magnet 201 and first magnet 202 are engaged by magnetic attraction. When it is desired to use landing net 105, magnets 201 and 202 are pulled apart with moderate force, whereupon magnet 201 remains attached to ring 112 and magnet 202 remains attached to the released landing net 105.

Referring again to FIG. 1, a second connection system 110 is provided that removably couples landing net 105 to vest 100 at the intersection 114 of handle 106 and loop 107. As shown in FIG. 1, second connection system 110 comprises connecting panel 115 (e.g. as shown in FIGS. 3A and 3B) secured to middle section 102 of vest 100 and connecting adaptor 116 (e.g. as shown in FIGS. 4A and 4B) secured to intersection 114 of landing net 105.

Figure 3A:
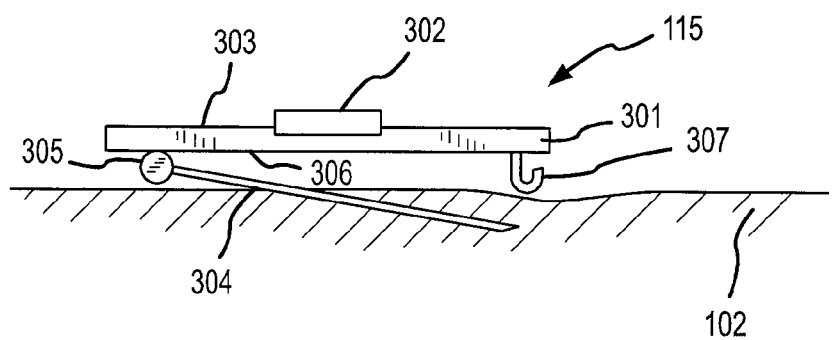
FIGS. 3A and 3B illustrate perspective views of alternative embodiments of a connecting panel adapted to be attached to the rear panel of a fishing garment.

FIG. 3A illustrates one embodiment of connecting panel 115, which may comprise a support 301 having connector 302 disposed on its upper surface 303. Pin 304 is attached through hinge 305 to lower surface 306 of support 301. The end of pin 304 is adapted to pierce the fabric of middle section 102 of vest 100 and then engage hook 307, thereby securing connecting panel 115 to vest 100. In this way, a connection system may easily be retrofit to existing clothing or garments.

Figure 3B:
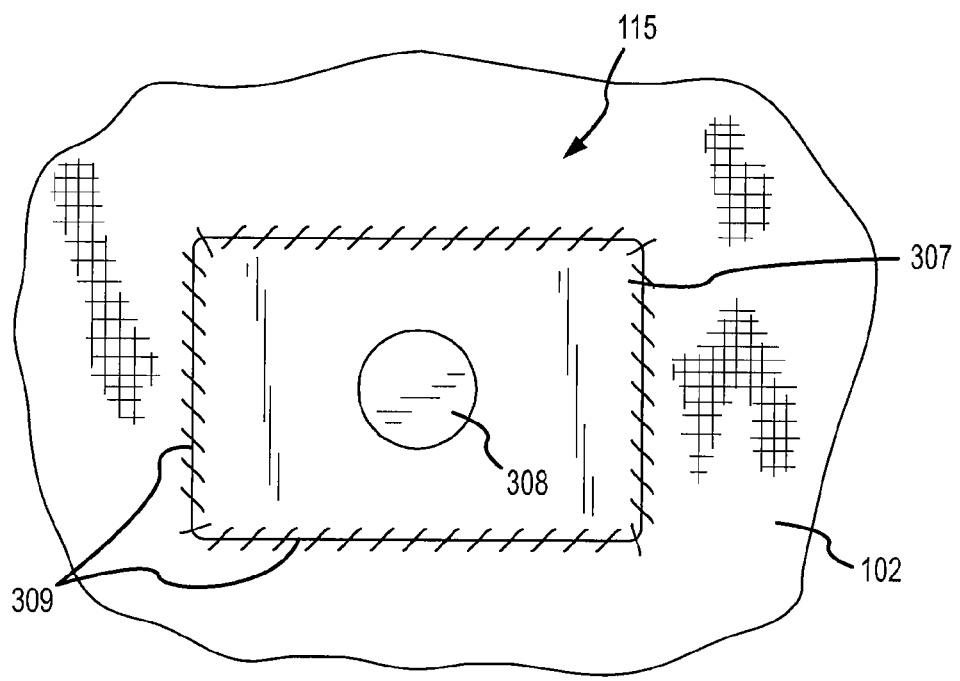

FIG. 3B illustrates another embodiment of connecting panel 115 comprising support 307 having connector 308 disposed on its upper surface. Connecting panel 115 may be sewn into the fabric of middle section 102 of vest 100 with stitches 309, thereby securing connecting panel 115 to the back panel of vest 100. Panel 115 may be provided at the time best 100 is manufactured, or at a later time.

Figure 4A:
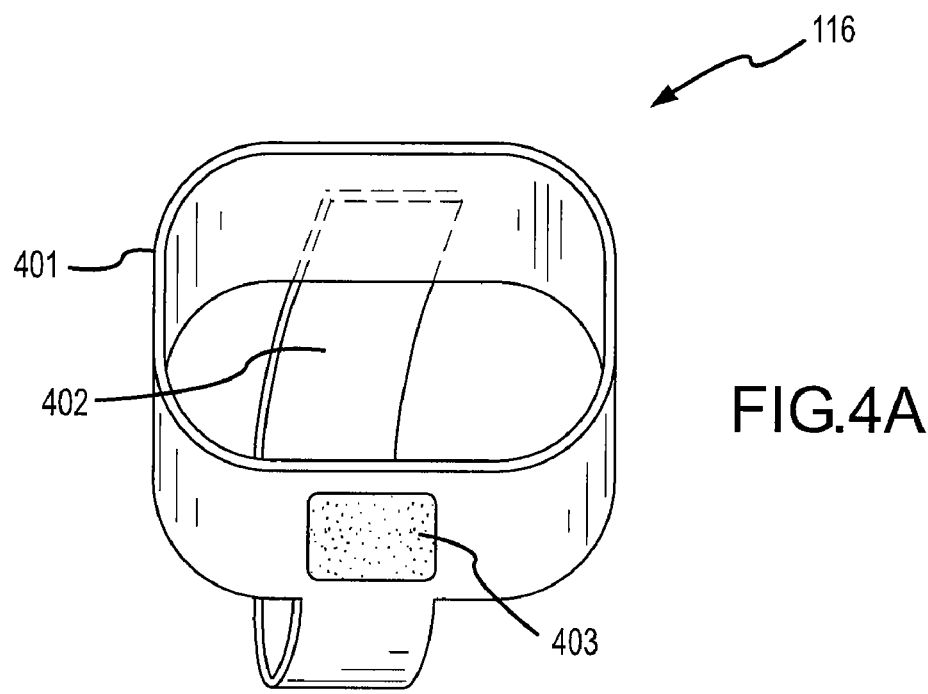
FIGS. 4A and 4B illustrate perspective views of one embodiment of a connecting adaptor adapted to be attached to the intersection of the handle and loop of a landing net.
Figure 4B:
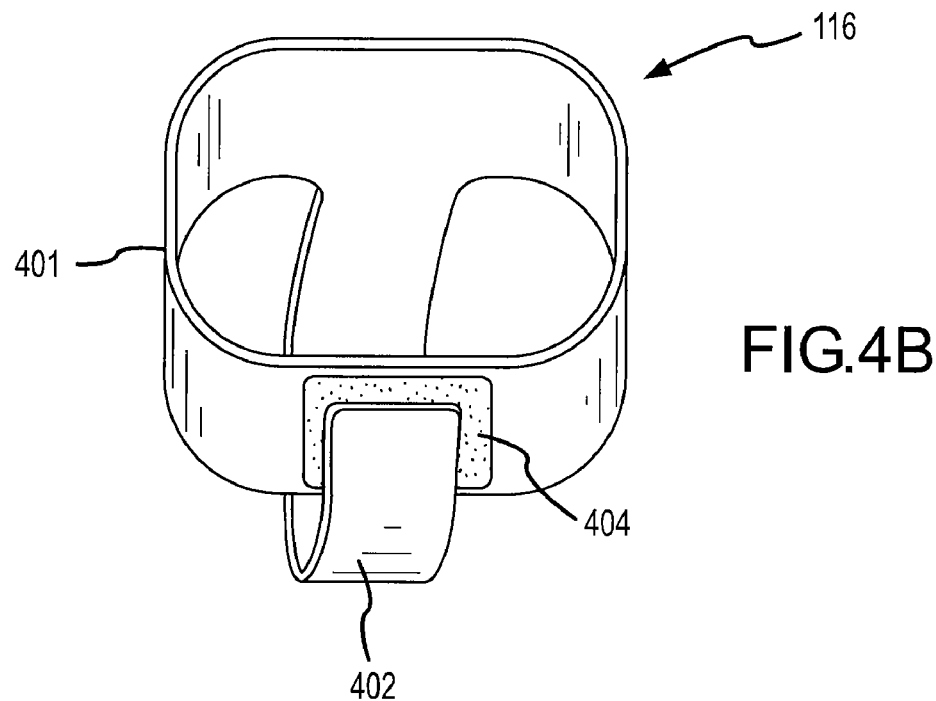

FIG. 4A illustrates one embodiment of connecting adaptor 116, which may comprise circumferential strap 401 adapted to wrap around handle 106 of landing net 105 (FIG. 1) and middle strap 402 adapted to engage circumferential strap 401 at each end thereof and wrap around loop 107 of landing net 105 at intersection 114 of handle 106 and loop 107 (FIG. 1). Circumferential strap 401 and middle strap 402 may be made from any suitable material, e.g. nylon, rubber, canvas, etc. Circumferential strap 401 may comprise a continuous circle that can be slid over handle 106 (as shown in FIGS. 4A and 4B), or a linear strip the ends of which may be secured together after wrapping around handle 106, e.g. using a hook and loop fastener such as Velcro® tape.

As shown in FIG. 4B, middle strap 402 may comprise a linear strip, one or both ends of which are secured to circumferential strap 401 using Velcro® tape 404. Connector 403 may be disposed on the outer surface of circumferential strap 401. When positioned on landing net 105, adaptor 116 covers the intersection 114 of handle 106 and loop 107, with connector 403 facing connecting panel 115 so as to engage the connector thereon. In some cases, connector 403 could be coupled with an adhesive, placed into a bored out hole in the net, or the like. Also, in one option, some or all of the net itself could be constructed of a metal so that it will easily couple to a magnet on the fishing vest, or vice versa.

The connectors used on connecting panel 115 and adaptor 116 may be any complementary connectors that secure landing net 105 to vest 100 when landing net 105 is not in use, yet pull apart when moderate force is applied to remove landing net 105 from vest 100. For example, the connectors on both connecting panel 115 and adaptor 116 may comprise first and second magnets that attract each other, or one connector may be a magnet and the other connector may be a metal plate to which the magnet is attracted. Alternatively, the connectors may comprise first and second hook and loop fasteners such as Velcro® tape. As a further example, one connector may be a ring and the other connector may be a spring-loaded hook or clip that releases from the clip when moderate force is applied.

The present invention is suitable for retrofitting fishing vests that are currently available at a variety of retail outlets. For example, many fishing vests now come equipped with a ring on the top of the rear panel, such as ring 112 shown in FIG. 1, and many landing nets include a handle clip such as clip 113 shown in FIG. 1. All that is required to take advantage of the present invention with such an arrangement would be to secure a connecting panel, such as connecting panel 115 shown in FIGS. 3A and 3B, to the middle section of the vest and to install a connecting adaptor, such as connecting adaptor 116 shown in FIGS. 4A and 4B, on the landing net so that the connector on the connecting adaptor engages with the connector on the connecting panel. Alternatively, a new vest may be manufactured with the connecting panel integrated into the back of the vest and/or a new landing net may be manufactured with a connector integrated into the intersection of the landing net.

Figures 5A, 5B:
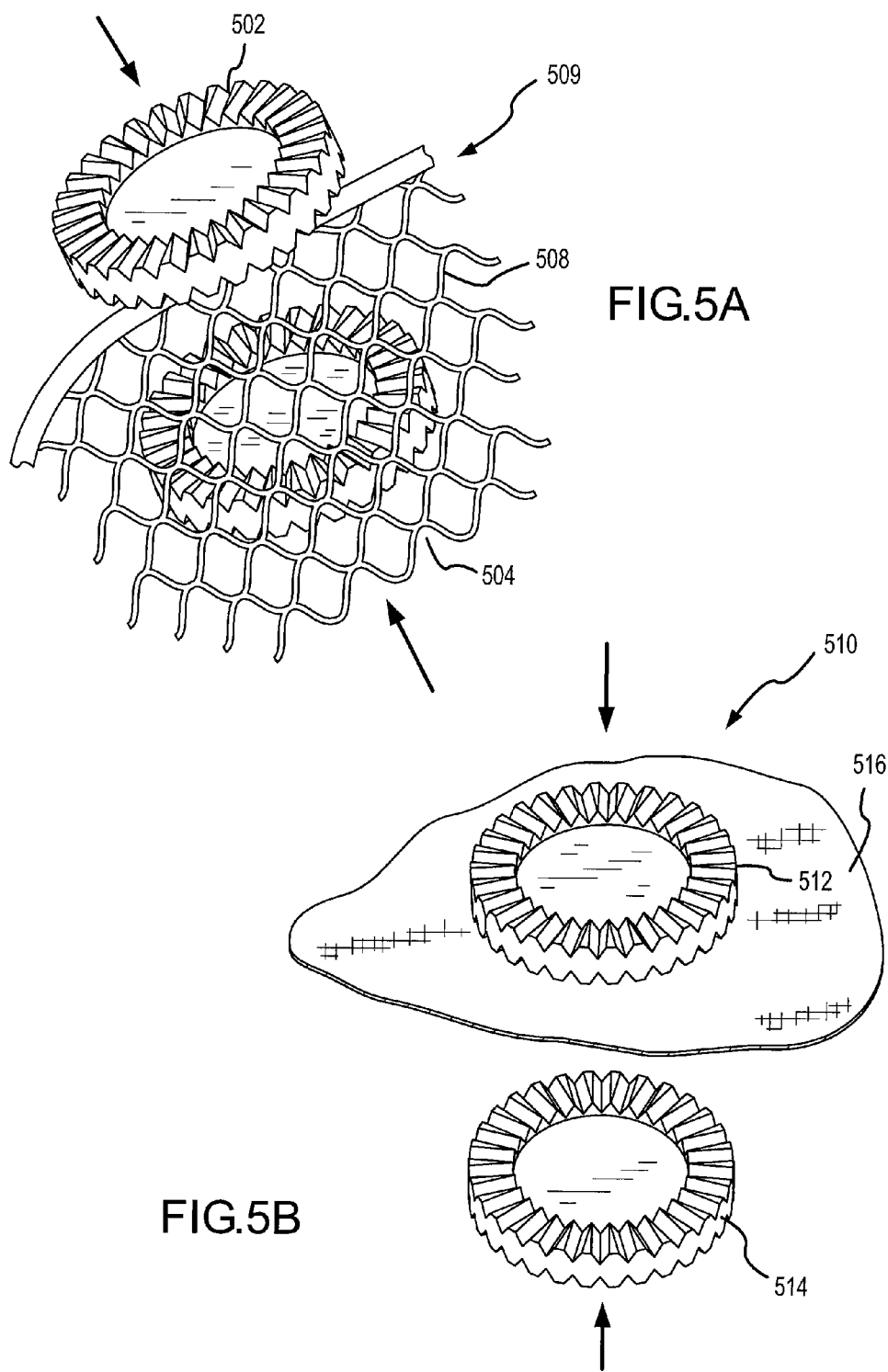
FIGS. 5A and 5B illustrates perspective view of another embodiment of a connecting system that may be used to removable couple a landing net to a user's garment.

Another embodiment of a system that may be used to easily retrofit a fishing net and garment with connectors is illustrated in FIGS. 5A and 5B. FIG. 5A illustrates a net connection system 500 that comprises a pair of magnets 502 and 504. Magnets 502 and 504 may be encased in a plastic or other protective material that permits the two magnets to easily interlock when attracted to each other. For example, the plastic may having interlocking features, teeth or detents which permit that magnets to interlock and keep from rotating relative to each other. Connection system 500 may be placed on either sides of the mesh 508 of a fishing net 509. In this way, the fishing net may easily be retrofit to include a connector. Typically, the magnets 502 and 504 will be placed on the mesh within a few inches of where the handle meets the loop, although other locations are possible.

FIG. 5B illustrates a garment connection system 510 that comprises magnets 512 and 514 which may be constructed in a manner similar to magnets 502 and 504. In this way, magnets 512 and 514 may be placed on opposite sides of a garment 516, such as a fishing vest, to hold the magnets to the garment.

When systems 500 and 510 are coupled to the net and the garment, they may be coupled together simply by hanging the fishing net from the user's back and permitting the two pairs of magnets 502, 504 and 512, 514 (which are attracted to each other) to couple to each other. By wiggling the net or the user's back, the two pairs of magnets will come close enough to each other to couple together.

This configuration permits a retrofit kit to be sold which includes four magnets and instructions for use. Such a system is inexpensive and easy to use.

The foregoing description is considered as illustrative only of the principles of the invention. Further, since numerous modifications and changes will readily occur to those skilled in the art, it is not desired to limit the invention to the exact details shown and described herein, and accordingly, all suitable modifications and equivalents may be resorted to, falling within the scope of the invention. Thus, it will be apparent to those skilled in the art that many changes and substitutions can be made to the preferred embodiments herein described without departing from the spirit and scope of the present invention as defined by the appended claims.

What is claimed is:

1. A kit for removably coupling a landing net to a user's garment, the kit comprising:
   a connection system that is configured to secure the landing net in a vertical position on the garment when not in use, wherein the connection system comprises a net portion and a garment portion; and
   instructions for using the connection system, wherein the instructions comprise steps for removably coupling the net portion to the landing net and the garment portion to the garment, and for removably coupling the landing net to the garment using the net portion and the garment portion;
   wherein the net portion comprises a first magnet and a second magnet, wherein the instructions comprise a step for placing a portion of a mesh of the net between the first and second magnets, wherein the garment portion comprises a third magnet and a fourth magnet, and wherein the instructions comprise a step for placing a portion of the garment between the third and fourth magnets.

2. A kit as in claim 1, wherein the magnets are cylindrical.

3. A kit as in claim 1, wherein the magnets have interlocking features.

4. A kit as in claim 1, wherein the magnets are encased in plastic.

5. A kit comprising:
   a landing net comprising a handle, a loop extending from the handle and a mesh coupled to the loop;
   a fishing garment;
   a connection system that is configured to secure the landing net in a certain position on a back panel of the fishing garment when not in use, wherein the connection system comprises a net portion and a garment portion; and
   instructions for using the connection system, wherein the instructions comprise steps for removably coupling the net portion to the mesh and the garment portion to the garment, and for removably coupling the landing net to the garment using the net portion and the garment portion;
   wherein the net portion comprises a first magnet and a second magnet, wherein the instructions comprise a step for placing a portion of the mesh of the net between the first and second magnets, wherein the garment portion comprises a third magnet and a fourth magnet, and wherein the instructions comprise a step for placing a portion of the garment between the third and fourth magnets.

6. A kit as in claim 5, wherein the garment comprises a fishing vest.

7. A kit as in claim 5, wherein the magnets are cylindrical.

8. A kit as in claim 5, wherein the magnets have interlocking features.

9. A kit as in claim 5, wherein the magnets are encased in plastic.

* * * * *